(12) United States Patent
Rees

(10) Patent No.: US 9,533,620 B1
(45) Date of Patent: Jan. 3, 2017

(54) FRONT BUMPER STEP

(71) Applicant: Mark E. Rees, Naugatuck, CT (US)

(72) Inventor: Mark E. Rees, Naugatuck, CT (US)

( * ) Notice: Subject to any disclaimer, the term of this patent is extended or adjusted under 35 U.S.C. 154(b) by 0 days.

(21) Appl. No.: 14/968,174

(22) Filed: Dec. 14, 2015

Related U.S. Application Data

(60) Provisional application No. 62/090,999, filed on Dec. 12, 2014.

(51) Int. Cl.
*B60R 3/00* (2006.01)

(52) U.S. Cl.
CPC .................................... *B60R 3/007* (2013.01)

(58) Field of Classification Search
CPC .................................. B60R 3/00; B60R 3/002
See application file for complete search history.

(56) References Cited

U.S. PATENT DOCUMENTS

| | | | |
|---|---|---|---|
| 3,159,242 A | 12/1964 | James | |
| 3,357,719 A | 12/1967 | McCrea | |
| 4,089,276 A | 5/1978 | Enos | |
| D263,132 S | 2/1982 | Mitchell | |
| 4,405,141 A | 9/1983 | Jurek | |
| 4,753,447 A | 6/1988 | Hall | |
| 5,829,774 A * | 11/1998 | Klemp | B60R 3/007 280/164.1 |
| 6,155,633 A * | 12/2000 | Minami | B62D 33/0604 293/115 |
| 6,170,842 B1 | 1/2001 | Mueller | |
| 6,416,112 B1 * | 7/2002 | Trivits | B60J 11/06 296/136.07 |
| 7,448,637 B2 | 11/2008 | Parker | |

* cited by examiner

*Primary Examiner* — John Walters
*Assistant Examiner* — James Triggs
(74) *Attorney, Agent, or Firm* — Robert C. Montgomery

(57) ABSTRACT

A step-up front bumper system is designed to be attached to the front frame of a truck, or other similar large vehicle. The purpose of this device is to provide a measure of protection from incidental contact and a step by which access to nearby portions of the vehicle may be gained. The device is configured to accommodate a variety of vehicles and step widths.

18 Claims, 6 Drawing Sheets

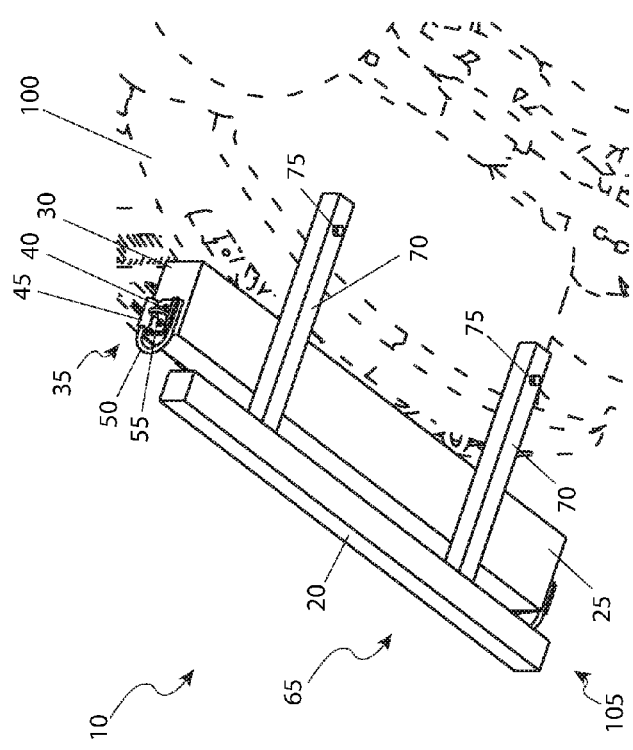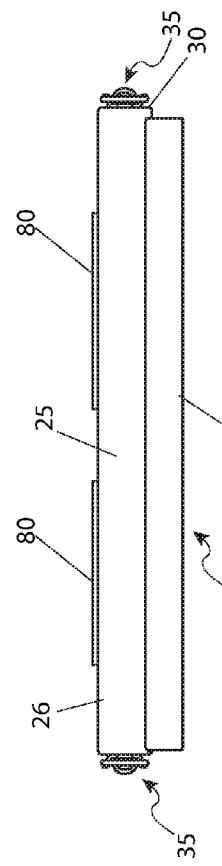

FRONT BUMPER STEP

RELATED APPLICATIONS

The present invention is a continuation of, was first described in, and claims the benefit of U.S. Provisional Application No. 62/090,999, filed Dec. 12, 2014, the entire disclosures of which are incorporated herein by reference.

FIELD OF THE INVENTION

The present invention relates generally to a step-up bumper assembly designed to attach to a front bumper of a vehicle.

BACKGROUND OF THE INVENTION

With sales at an all-time high, the popularity of the pick-up style truck as an everyday vehicle is more widespread than it ever has been. Their utility and convenience in hauling items coupled with the availability of luxury interiors and extended cab space have made the pickup a popular alternative to other vehicles. The availability of aftermarket accessories also enhances the attractiveness of pickup trucks as well. Several of these aftermarket products, such as hitch steps, bumper platforms, and running boards, are designed to improve access to various interior and exterior areas on the vehicle. While they do their job fairly well, they are very utilitarian in appearance, and even tend to detract from the appearance of the vehicle. Accordingly, there exists a need for a means by which a bumper step can be provided with an enhanced visual appearance. The use of the present invention provides access to all points of a motor vehicle in a manner which is not only quick, easy, and effective, but stylish as well.

SUMMARY OF THE INVENTION

It is therefore an object of the present invention to provide such a step that is capable of being removably attached to a front of a vehicle. The step comprises a frame assembly, a block having a bottom surface attached to the frame assembly, at least one (1) block bracket, each attached to an end face of said block, and at least one (1) step plate affixed to an upper surface of the block.

Another object of the present invention is to provide such a frame assembly including a front frame member and at least one (1) rear frame member. Each of the rear frame members are attached perpendicularly to the rear face of the front frame member. Each rear frame member is configured to be attached to the front of the vehicle.

Another object of the present invention is to provide a bracket plate, fashioned as a planar member attached to the block and having a pair of wings extending away from the planar member. A first shackle is attached to the pair of wings and oriented in a similar plane as the planar member. A second shackle is attached to and oriented in a plane perpendicular to the planar member. In at least one (1) embodiment, the second shackle is smaller than said first shackle. Each first and second shackle are configured to be used as a securing point to a load being pulled by the vehicle when the step is attached.

Another object is to provide such a block that is generally a rectangular polyhedron. In at least one (1) embodiment, the block is a hardwood.

Yet another object is to provide such a step plate that is generally rectangular. In various embodiments, the step plate is either a diamond plate or a four-way safety plate. Other embodiments also provided for a plurality of step plates. In all embodiments, it is preferred that the singular step plate or plurality of step plates are arranged so they are centrally located on the block.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3 is an environmental bottom view of the front bumper 10 in accordance with the preferred embodiment of the present invention;

FIG. 4 is front elevation view of the front bumper 10 in accordance with the preferred embodiment of the present invention;

DESCRIPTIVE KEY

10 front bumper
 20 front frame member
 25 block
 26 ledge
 30 end face
 35 block bracket
 40 bracket fastener
 45 bracket plate
 47 plate face
 48 wing
 49 ear
 50 first shackle
 55 second shackle
 65 frame assembly
 70 rear frame member
 75 frame member aperture
 80 step plate 85 plate aperture
90 unitary step plate
100 vehicle
105 vehicle hood

DETAILED DESCRIPTION OF THE PREFERRED EMBODIMENT

Figure 1:
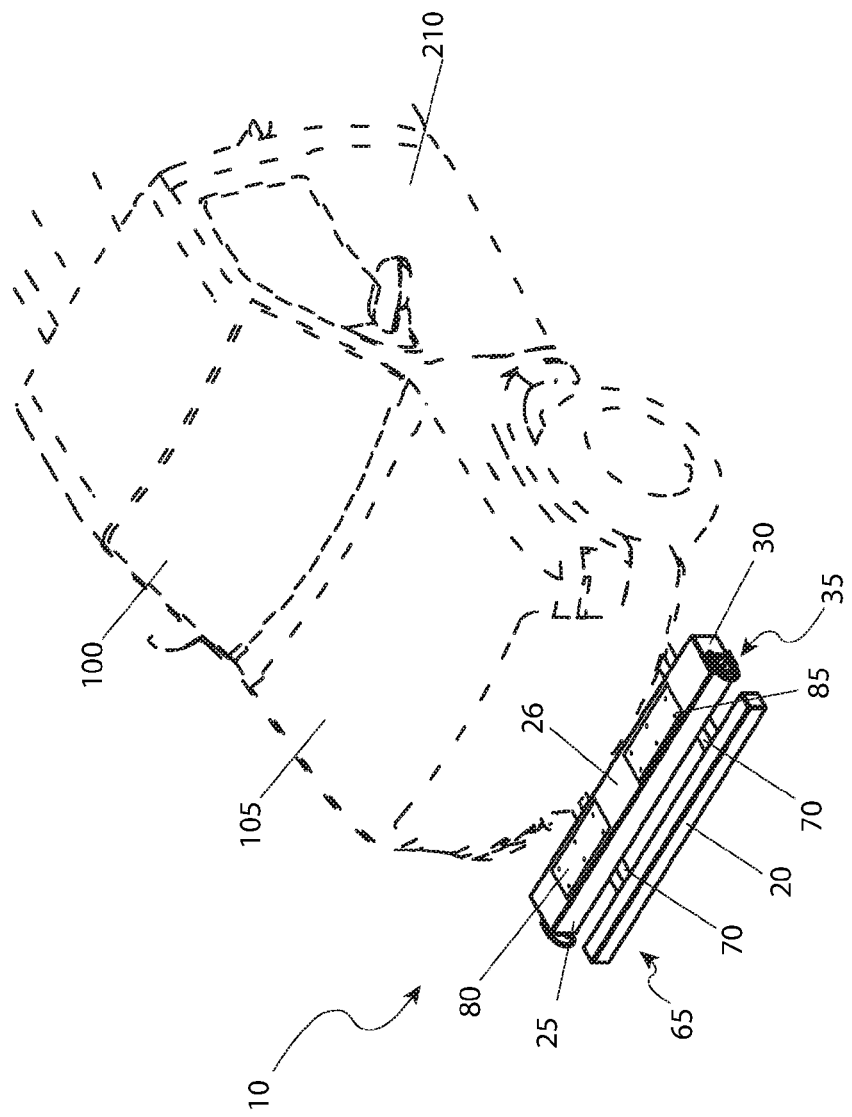
FIG. 1 is an environmental top perspective view of a front bumper 10 in accordance with the preferred embodiment of the present invention, showing a pair of step plates 80.
Figure 2:
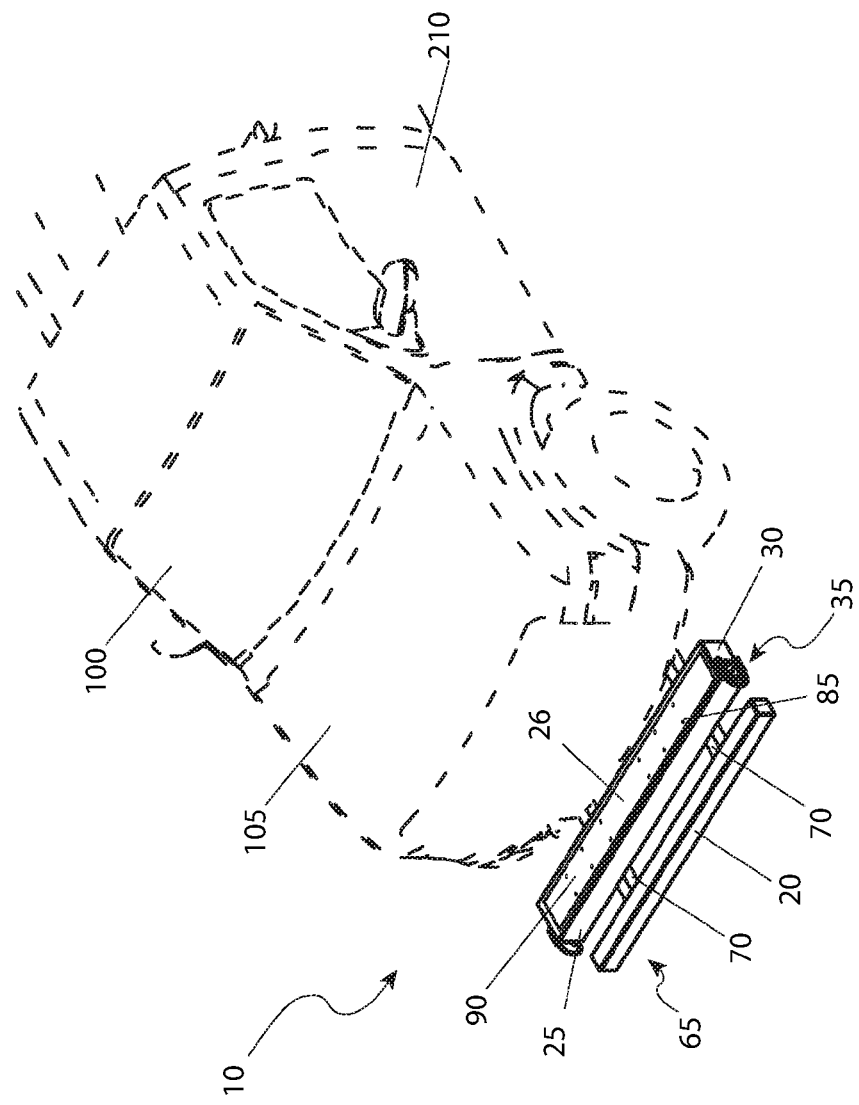
FIG. 2 is an environmental top perspective view of the front bumper 10 in accordance with an alternate embodiment of the present invention, showing a unitary step plate 90.
Figure 5:
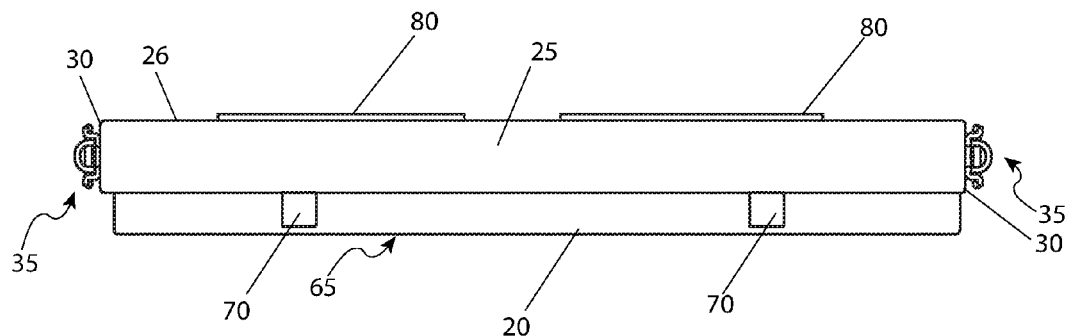
FIG. 5 is a rear elevation view of the front bumper 10 in accordance with the preferred embodiment of the present invention.
Figure 6:
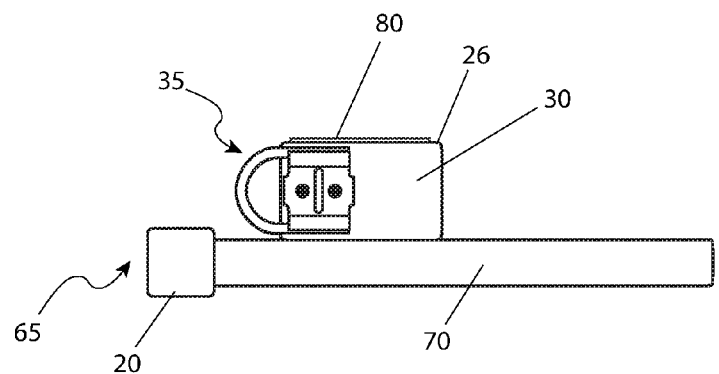
FIG. 6 is a first side elevation view of the front bumper 10 in accordance with the preferred embodiment of the present invention.
Figure 7:
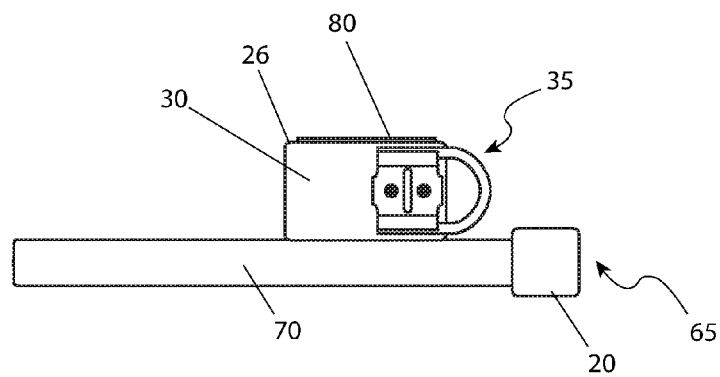
FIG. 7 is an opposite second side elevation view of the front bumper 10 in accordance with the preferred embodiment of the present invention.
Figure 8:
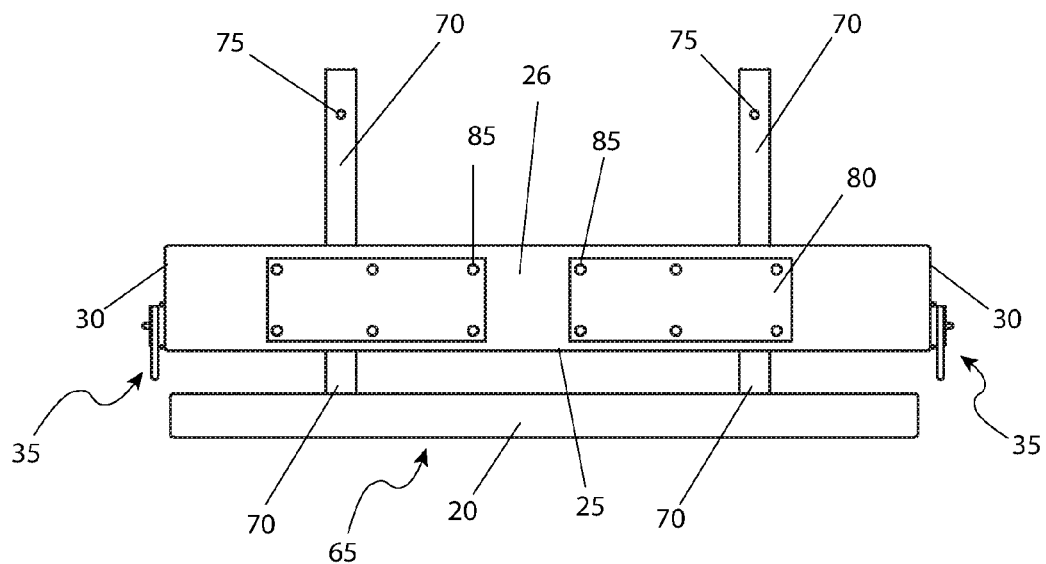
FIG. 8 is top plan view of the front bumper 10 in accordance with the preferred embodiment of the present invention.
Figure 9:
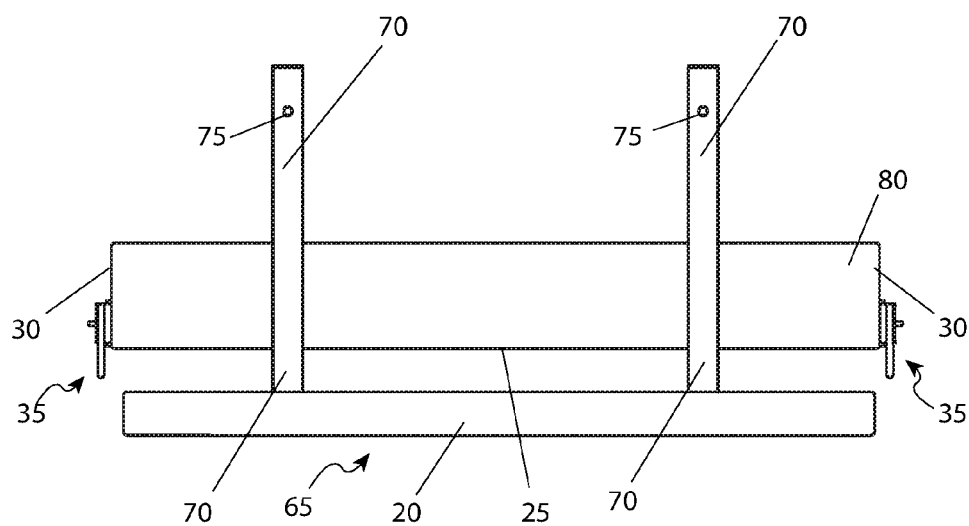
FIG. 9 is a bottom plan view of the front bumper 10, from an under side, in accordance with the preferred embodiment of the present invention; and, FIG. 10 is an isolated view of a block bracket 35 of the hardwood step-up front bumper system 10 in accordance with the preferred embodiment of the present invention.

The best mode for carrying out the invention is presented in terms of its preferred embodiment, herein depicted within FIGS. 1 and 3-10. An alternate embodiment is depicted in FIG. 2. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a step-up front bumper (herein referred to as the "system") 10, which primarily provides a block 25 capable of supporting a user's weight, at a front of a vehicle 100. It is preferred that the block 25 be fabricated out of a hardwood. The user may more easily be able to gain access to elevated portions of that vehicle 100, such as a vehicle hood 105. The block 25 may also serve other utility purposes, such as, but not limited to, a seating area, or a cargo-carrying platform. Due to the outboard positioning of various segments, the system 10 may also serve as a deflector of incidental contact for the vehicle 100. The terms "front" and "back" or "rear" are used consistent with the front and back/rear directions of the vehicle 100 to which the system 10 may be attached.

Referring now to FIGS. 1 and 3-10, major projection views and isometric views, from different perspectives, of the system 10, according to the preferred embodiment of the present invention, are disclosed. The system 10 includes a frame assembly 65 to be attached to a front of a vehicle 100, and a block 25 having at least one (1) block bracket 35, detailed in FIG. 10, secured to an end face 30 thereof. The frame assembly 65 is composed of a plurality of rear frame members 70 bolted, or otherwise fastened, together to support the block 25 and affix the system 10 to the frame of the vehicle 100, and a front frame member 20. This attachment is achieved through the use of threaded frame fasteners securing the rear frame members 70 to frame member apertures 75 drilled into, or through, the appropriate frame members of the vehicle 100 in cooperation with included nuts. It is envisioned that the installation of this frame assembly 65 will be performed by a skilled tradesman qualified to perform such services. The rear frame members 70 are preferably composed of UNISTRUT®; however, other steel strut material, or structural steel tubing, may be utilized without limiting the scope of the system 10. The frame assembly 65 incorporates a front frame member 20 located on a distal side of the block 25. This front frame member 20 is attached to the rear frame members 70 at a location subjacent to the block 25, such that the rear frame members 70 extend at a perpendicular direction away from the rear surface thereof.

The block 25 is configured to be a rectangular polyhedron composed of any of a variety of hardwoods typically utilized for wooden support structures. The block 25 may be rough-hewn, or planed and sanded, with any type of coating, or treatment, to inhibit deterioration and provide aesthetic appeal as may suit the taste of a particular user. The wooden block 25 preferably has a cross-sectional size of nominally four inches (4 in.) high by eight inches (8 in.) thick. It is understood that other nominal sizes may be accommodated in any other embodiment without limiting the scope of the system 10. The block 25 is attached to upper surfaces of some or all of the rear frame members 70. An upper surface of the block 25 is a horizontal plane generally referred to as a ledge 26. The ledge 26 may be provided with a step plate 80, 90 to improve traction on the ledge 26. The step plate 80, 90 may be a diamond plate or a four-way safety plate in order to achieve this improved traction. The step plate 90 may be disposed upon the ledge 26 as a single piece as is shown in FIG. 2, or may be divided into a plurality of step plates 80 (such as a pair of step plates 80 as in a preferred embodiment) spaced over the surface of the ledge 26 in some manner. The unitary step plate 90 is envisioned as encompassing the same area as all of the preferred step plates 80 plus all the gaps therein. The step plate 80, 90 is attached to the ledge 26 by means of a plurality of fasteners each passing through one (1) of a plurality of plate fasteners 85 aligned with a fastener of the ledge 26 (not shown). The system 10 may be adapted to span any portion of the front of the vehicle 100 so long as a sufficient number of rear frame members 70 are attached to the frame of the vehicle 100 to support the anticipated loads placed thereupon.

Figure 10:
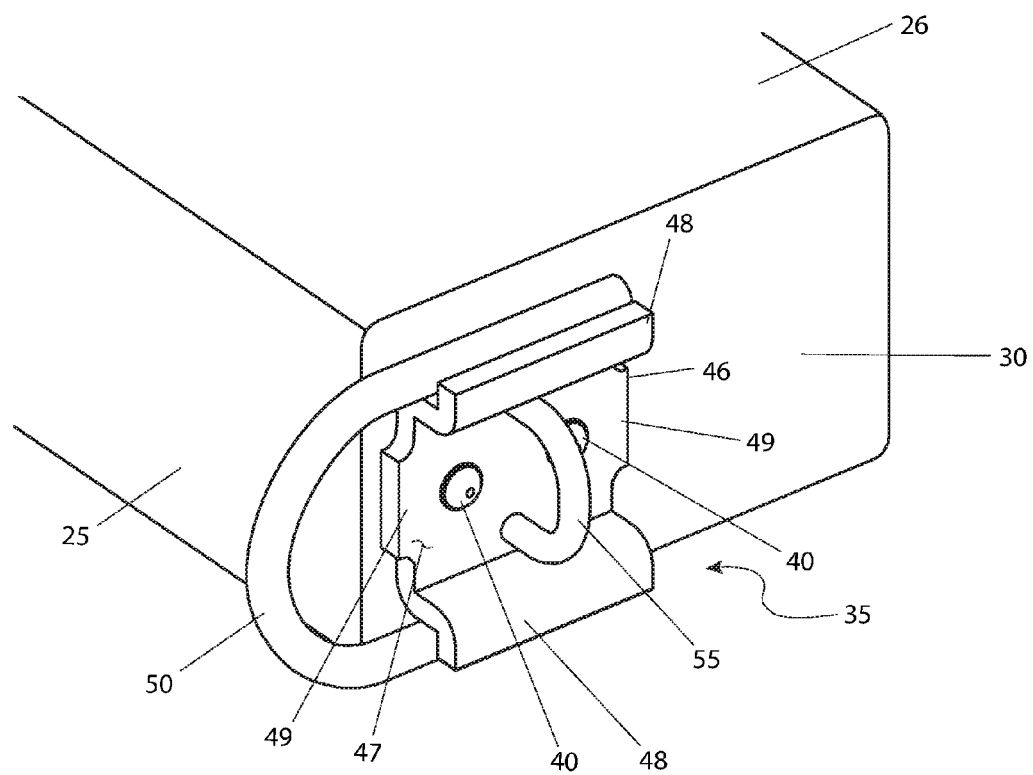

Referring now to FIG. 10, an isolated view of a block bracket 35, of the system 10, according to the preferred embodiment of the present invention, is disclosed. Disposed preferably on both vertical end faces 30 of the block 25 are block brackets 35. The block bracket 35 is configured to be a steel weldment having a formed bracket plate 45 to which a first shackle 50 and a smaller second shackle 55 are attached. The bracket plate 45 is an essentially rectangular, planar back member with "L"-shaped wings 48 on an upper and a lower side. The wings 48 are preferably formed on a radius to alleviate stress risers in the bracket plate 45. The first shackle 50 is a "U"-shaped round bar oriented in the same plane as the bracket plate 45. The first shackle 50 is attached to the bracket plate 45, preferably by welding, to a face of the bracket plate 45 in closest proximity to the end face 30 of the block 25. The second shackle 55 is similarly "U"-shaped with an orientation perpendicular to the bracket plate 45 and therefore perpendicular to the end face 30 of the block 25. The second shackle 55 is attached, preferably by welding, to a plate face 47 of the bracket plate 45. The block bracket 35 is attached to the block 25 by means of a plurality of threaded bracket fasteners 40 inserted through apertures (not shown) in the bracket plate 45 and secured into the material of the block 25. The bracket plate 45 may be provided with decorative ears 49 of any configuration. It is envisioned that the block brackets 35 will be utilized as securing points for pulling loads with the vehicle 100, or as tie-down anchors for loads supported on the ledge 80.

The preferred embodiment of the present invention can be utilized by the enabled user in a simple and straightforward manner with little or no training. After initial purchase or acquisition of the system 10, it would be installed as indicated either in FIG. 1 or 2. The method of installing and utilizing the system 10 may be achieved by performing the following steps: acquiring a model of the system 10 having a desired style to suit the taste of a user; having the frame assembly 65 installed by a qualified provider of such services; utilizing the ledge 26 to access a desired portion of the vehicle hood 105 by stepping onto and standing upon the ledge 26. The ledge 26 may also be utilized as a seat, or as a horizontal support for other selected items. The block brackets 35 may be utilized, individually, or in concert, for the attachment of towing equipment, tie-down restraints, or the like, at the discretion of a user. The system 10 may provide some damage reduction benefit to the vehicle 100 in an entirely passive manner.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A removably attachable step, comprising:
   a frame assembly, comprising:
      a front frame member; and,
      at least one rear frame member, each adapted to be removably attached to a front of a vehicle and each having a first end perpendicularly attached to a rear side of said front frame member;
   a block, having a bottom surface removably attached to to a top surface of at least one of said rear frame members;
   at least one block bracket, each attached to an end face of said block; and,
   a pair of step plates, each attached to an upper surface of said block.

2. The step of claim 1, wherein said block is configured as a rectangular polyhedron.

3. The step of claim 2, wherein said block is composed of a hardwood.

4. The step of claim 1, wherein each block bracket further comprises:
   a bracket plate, comprising a planar member attached to said block and a pair of wings extending away from said planar member;
   a first shackle attached to said pair of wings and oriented in a similar plane as said planar member; and,
   a second shackle attached to and oriented in a plane perpendicular to said planar member;
   wherein said second shackle is smaller than said first shackle; and,
   wherein said first and second shackles are configured to be used as a securing point to a load being pulled by said vehicle when said step is attached to said vehicle.

5. The step of claim 1, wherein each step plate is a diamond plate or a four-way safety plate.

6. The step of claim 1, wherein said pair of step plates are located at equidistant positions on either side of an axial centerline.

7. The step of claim 6, wherein each step plate is a diamond plate or a four-way safety plate.

8. The step of claim 6, wherein each step plate is a rectangular planar body.

9. The step of claim 8, wherein each step plate is a diamond plate or a four-way safety plate.

10. A removably attachable step, comprising:
    a frame assembly, comprising:
       a front frame member; and,
       at least one rear frame member, each adapted to be removably attached to a front of a vehicle and each having a first end perpendicularly attached to a rear side of said front frame member;
    a block, having a bottom surface removably attached to to a top surface of at least one of said rear frame members;
    at least one block bracket, each attached to an end face of said block; and,
    a step plate attached to an upper surface of said block.

11. The step of claim 10, wherein said block is configured as a rectangular polyhedron.

12. The step of claim 11, wherein said block is composed of a hardwood.

13. The step of claim 10, wherein each block bracket further comprises:
    a bracket plate, comprising a planar member attached to said block and a pair of wings extending away from said planar member;
    a first shackle attached to said pair of wings and oriented in a similar plane as said planar member; and,
    a second shackle attached to and oriented in a plane perpendicular to said planar member;
    wherein said second shackle is smaller than said first shackle; and,
    wherein said first and second shackles are configured to be used as a securing point to a load being pulled by said vehicle when said step is attached to said vehicle.

14. The step of claim 10, wherein said step plate is a diamond plate or a four-way safety plate.

15. The step of claim 10, wherein said step plate is centrally positioned on said block.

16. The step of claim 15, wherein said step plate is a diamond plate or a four-way safety plate.

17. The step of claim 15, wherein said step plate is a rectangular planar body.

18. The step of claim 17, wherein said step plate is a diamond plate or a four-way safety plate.

* * * * *